(No Model.)

F. E. BENNETT.
GARMENT HOOK.

No. 493,011. Patented Mar. 7, 1893.

WITNESSES:
P. H. Cragle
Wm. C. Wiedersheim

INVENTOR
Francis E. Bennett
BY John A. Wiedersheim
ATTORNEY.

UNITED STATES PATENT OFFICE.

FRANCIS E. BENNETT, OF PHILADELPHIA, PENNSYLVANIA.

GARMENT-HOOK.

SPECIFICATION forming part of Letters Patent No. 493,011, dated March 7, 1893.

Application filed October 24, 1891. Serial No. 409,664. (No model.)

*To all whom it may concern:*

Be it known that I, FRANCIS E. BENNETT, a subject of the Queen of Great Britain, residing in the city and county of Philadelphia, State of Pennsylvania, have invented a new and useful Improvement in Garment-Hooks, which improvement is fully set forth in the following specification and accompanying drawings.

My invention consists of a garment hook formed with a coil at the outer end of the hook proper, thus rendering the said hook elastic in lateral direction for preventing the accidental disengagement of the eye, as will be hereinafter fully set forth.

Figure 1:
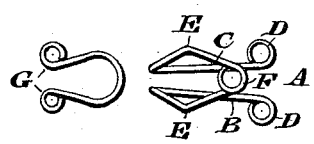
Figure 2:
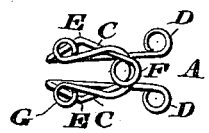
Figure 3:
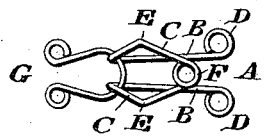

Figure 1 represents a face view of a garment hook embodying my invention, the same being shown separated from the eye. Fig. 2 represents a face view of said hook partly engaged by the eye. Fig. 3 represents a face view of the hook fully engaged by the eye.

Similar letters of reference indicate corresponding parts in the several figures.

Referring to the drawings: A designates a garment hook, the same being formed of the shank B and hook proper C, each composed of two lengths or pieces of wire continuous of each other, the shank being provided with eyes D for attaching purposes. The pieces comprising the hook C are bulged outwardly and then inclined inwardly, forming at or about the middle of the length of the hook a widened portion, or the swells E, and the outer end of said hook has a coil F, which joins the side pieces thereof, thus producing a spring at said end in the length of the hook proper. The eye G is normally of less width than the distance between the outer portion of the swells when the hook is not compressed.

The operation is as follows: The eye G is presented to the hook in order to be connected therewith, after the manner of a hook and eye, and then drawn backward so as to ride over the swells E, whereby the side pieces of the hook proper are forced toward each other, or closed so as to permit the eye to pass the same. When the eye has cleared the swells, the side pieces expand or resume their normal position, whereby the eye is reliably held on the hook and controlled by the swells E, thus preventing the improper separation of the eye from the hook. When it is desired to disconnect the hook and eye, the latter is moved over the hook proper and superior force exerted against the swells, so as to press the side pieces of the hook proper toward each other, whereby the eye may pass the same and clear the hook, and the parts become separated, it being noticed that the coil F permits the side pieces of the hook proper to contract and expand to accomplish the results hereinbefore stated.

Having thus described my invention, what I claim as new, and desire to secure by Letters Patent, is—

A garment fastener consisting of a hook and an eye, said hook being composed of a single piece of wire having securing eyes at its ends, a double shank and hook proper with a coiled end and having bulging portions at or about the center of its sides, forming swells extending beyond the sides of the shank, and said eye being of less width than the normal width of the hook at the swells, substantially as and for the purpose set forth.

FRANCIS E. BENNETT.

Witnesses:
JOHN A. WIEDERSHEIM,
A. P. JENNINGS.